US00RE45386E

(19) United States
(12) Reissued Patent
Marriott

(10) Patent Number: US RE45,386 E
(45) Date of Reissued Patent: Feb. 24, 2015

(54) MEANS FOR REMOVING UNWANTED IONS FROM AN ION TRANSPORT SYSTEM AND MASS SPECTROMETER

(75) Inventor: Philip Marriott, Buxton (GB)

(73) Assignee: Thermo Fisher Scientific (Bremen) GmbH, Bremen (DE)

(21) Appl. No.: 14/032,096

(22) Filed: Sep. 19, 2013

Related U.S. Patent Documents

Reissue of:
(64) Patent No.: 7,202,470
Issued: Apr. 10, 2007
Appl. No.: 09/787,358
PCT Filed: Sep. 16, 1999
PCT No.: PCT/GB99/03076
§ 371 (c)(1),
(2), (4) Date: May 15, 2001
PCT Pub. No.: WO00/16375
PCT Pub. Date: Mar. 23, 2000

(30) Foreign Application Priority Data

Sep. 16, 1998 (GB) ..... 98202104

(51) Int. Cl.
*H01J 49/00* (2006.01)
*H01J 49/26* (2006.01)
*B01D 59/44* (2006.01)

(52) U.S. Cl.
USPC ..... 250/281; 250/282; 250/283; 250/287; 250/423 R; 250/424; 315/111.81; 315/111.21

(58) Field of Classification Search
CPC ..... H01J 49/105; H01J 49/421; H01J 49/02; H01J 49/062; H01J 49/0095; H01J 49/06
USPC ..... 250/281, 282, 283, 287, 423 R, 424; 315/111.81, 111.21
See application file for complete search history.

(56) References Cited

U.S. PATENT DOCUMENTS 3,129,327 A 4/1964 Brubaker
3,937,955 A 2/1976 Comisarow et al.
4,148,196 A 4/1979 French et al.
4,234,791 A 11/1980 Enke et al.

(Continued)

FOREIGN PATENT DOCUMENTS

EP 0237259 A2 9/1887
EP 0373835 6/1990

(Continued)

OTHER PUBLICATIONS

Agilent Technologies Inc., Publication No. 5968-8813E, Dec. 1999, pp. 1-12.

(Continued)

*Primary Examiner* — Nikita Wells
(74) *Attorney, Agent, or Firm* — Kilpatrick Townsend & Stockton LLP

(57) ABSTRACT

The present invention relates to inductively coupled plasma mass spectrometry (ICPMS) in which a collision cell is employed to selectively remove unwanted artefact ions from an ion beam by causing them to interact with a reagent gas. The present invention provides a first evacuated chamber (6) at high vacuum located between an expansion chamber (3) and a second evacuated chamber (20) containing the collision cell (24). The first evacuated chamber (6) includes a first ion optical device (17). The collision cell (24) contains a second ion optical device (25). The provision of the first evacuated chamber (5) reduces the gas load on the collision cell (24), by minimising the residual pressure within the collision cell (24) that is attributable to the gas load from the plasma source (1). This serves to minimise the formation, or re-formation, of unwanted artefact ions in the collision cell (24).

50 Claims, 2 Drawing Sheets

(56) References Cited

U.S. PATENT DOCUMENTS

| | | | | |
|---|---|---|---|---|
| 4,328,420 | A | 5/1982 | French | |
| 4,535,235 | A | 8/1985 | McIver, Jr. | |
| 4,542,293 | A | 9/1985 | Fenn et al. | |
| 4,746,794 | A | 5/1988 | French et al. | |
| 4,948,962 | A | 8/1990 | Mitsui et al. | |
| 4,963,736 | A | 10/1990 | Douglas et al. | |
| 5,043,575 | A | 8/1991 | Habfast et al. | |
| 5,049,739 | A | 9/1991 | Okamoto | 250/281 |
| 5,134,286 | A | 7/1992 | Kelley | |
| 5,157,260 | A | 10/1992 | Mylchreest et al. | |
| 5,223,711 | A | 6/1993 | Sanderson et al. | |
| 5,352,892 | A | 10/1994 | Mordehai et al. | |
| 5,381,008 | A | 1/1995 | Tanner et al. | |
| 5,426,301 | A | 6/1995 | Turner | |
| 5,481,107 | A | 1/1996 | Takada et al. | |
| 5,514,868 | A | 5/1996 | Dixon | |
| 5,565,679 | A | 10/1996 | Tanner et al. | |
| 5,652,427 | A | 7/1997 | Whitehouse et al. | |
| 5,663,560 | A | 9/1997 | Sakairi et al. | |
| 5,672,868 | A | 9/1997 | Mordehai et al. | |
| 5,767,512 | A * | 6/1998 | Eiden et al. | 250/282 |
| 5,818,041 | A * | 10/1998 | Mordehai et al. | 250/281 |
| 5,939,718 | A | 8/1999 | Yamada et al. | |
| 6,028,308 | A | 2/2000 | Hager | |
| 6,093,929 | A * | 7/2000 | Javahery et al. | 250/282 |
| 6,140,638 | A * | 10/2000 | Tanner et al. | 250/282 |
| 6,191,417 | B1 | 2/2001 | Douglas et al. | |
| 6,222,185 | B1 | 4/2001 | Speakman et al. | |
| 6,259,091 | B1 * | 7/2001 | Eiden et al. | 250/281 |
| 6,340,814 | B1 | 1/2002 | Vandermey | |
| 6,348,688 | B1 * | 2/2002 | Vestal | 250/287 |
| 6,512,226 | B1 * | 1/2003 | Loboda et al. | 250/292 |
| 6,576,897 | B1 | 6/2003 | Steiner et al. | |
| 6,627,883 | B2 | 9/2003 | Wang et al. | |
| 6,630,665 | B2 | 10/2003 | Tanner et al. | |
| 6,700,120 | B2 | 3/2004 | Hager | |
| 6,753,523 | B1 | 6/2004 | Whitehouse | |
| 6,797,948 | B1 | 9/2004 | Wang | |
| 6,815,667 | B2 | 11/2004 | Tanner et al. | |
| 6,911,650 | B1 | 6/2005 | Park | |
| 6,992,281 | B2 | 1/2006 | Abou-Shakra et al. | |
| 7,049,584 | B1 * | 5/2006 | Whitehouse et al. | 250/288 |
| 7,202,470 | B1 | 4/2007 | Marriott | |
| 7,230,232 | B2 * | 6/2007 | Marriott | 250/281 |
| 7,339,163 | B2 * | 3/2008 | Marriott | 250/281 |
| 2001/0038069 | A1 | 11/2001 | Whitehouse et al. | |
| 2002/0079443 | A1 | 6/2002 | Krutchinsky et al. | |

FOREIGN PATENT DOCUMENTS

| | | | |
|---|---|---|---|
| EP | 0813228 | A1 | 12/1997 |
| EP | 0871201 | A1 | 10/1998 |
| EP | 1109198 | | 6/2001 |
| EP | 1114437 | | 7/2001 |
| EP | 0 871 977 | B1 | 5/2004 |
| EP | 0871977 | | 5/2004 |
| GB | 2301704 | | 12/1996 |
| GB | 2370686 | | 7/2002 |
| JP | 5248482 | | 9/1975 |
| JP | 5960856 | A | 4/1984 |
| JP | 62264546 | | 11/1987 |
| JP | 02158047 | | 6/1990 |
| JP | 03261062 | | 11/1991 |
| JP | 05036376 | | 2/1993 |
| JP | 09082274 | | 3/1997 |
| JP | 10097838 | | 4/1998 |
| JP | 10223174 | A | 8/1998 |
| WO | 95/23018 | A1 | 8/1995 |
| WO | 97/07530 | A1 | 2/1997 |
| WO | 97/25737 | A1 | 7/1997 |
| WO | WO 97/25737 | | 7/1997 |
| WO | 97/47025 | A1 | 12/1997 |
| WO | 98/56030 | | 10/1998 |
| WO | 99/30351 | | 6/1999 |
| WO | 99/38185 | | 7/1999 |
| WO | 99/38193 | A1 | 7/1999 |
| WO | 99/62101 | A1 | 12/1999 |
| WO | 99/63578 | A2 | 12/1999 |
| WO | 01/01446 | A1 | 1/2001 |
| WO | 01/15201 | | 3/2001 |
| WO | 03/096376 | A1 | 11/2003 |

OTHER PUBLICATIONS

Akbar Montaser, "Inductively Coupled Plasma Mass Spectrometry", Wiley-VCH, 1998.

Barinaga, et al., "Ion-Molecule Reactions in an RF-Multipole . . . ", Proc. 45.sup.th ASMS Conference, Jun. 1997.

Barinaga, et al., "Ion-Trap Mass Spectrometry With An Inductively Coupled Plasma Source", Rapid Communications in Mass Spectrometry, 8:71-76, 1994, pp. 71-76.

Batey. J., "Incorporating Collision Cell Technology Into A Quadrupole ICP/MS", Presentation No. 55 at FACSS, Oct. 25, 1999 (abstract).

Brenner, I.B., "Characterization of A New Collision Cell ICP-MS for Environmental And Geochemical Analysis", 2000 Winter Conference On Plasma Spectrochemistry, Fort Lauderdale, FL, pp. 338-339.

Brotherton,Harry, O., et al., "Determination of Drugs in Blood Serum by Mass Spectrometry/Mass Spectrometry," Anal. Chem. 1983, vol. 55, pp. 449-553.

Crain, et al., "Matrix Interferences in Inductively Coupled Plasma-Mass Spectrometry: Some Effects of Skimmer Orifice Diameter and Ion Lens Voltages", Spectrochimica Acta, 43B (9-11), 1988, pp. 1355-1364.

Dawson, P.H., et al., "The Use of Triple Quadrupoles for Sequential Mass Spectrometry," Organic Mass Spectrometry, 1982, vol. 17, No. 5, pp. 205-211.

Douglas, D.J., "Collisonal Focusing Effects in Radio Frequency Quadrupoles," American Society for Mass Spectrometry, 1992, pp. 398-408.

Douglas, D.J., "Some Current Perspectives on ICP-MS," Canadian Journal of Spectroscopy, 1988, pp. 38-49.

Du, Z., et al., "Elemental analysis with quadrupole mass filters operated in higher stability regions," J. Anal. At. Spectrom, 1999, vol. 14, pp. 1111-1119.

Eiden, et al., "Beneficial Ion/Molecule Reactions in Elemental Mass Spectrometry", Rapid Communications in Mass Spectrometry, 11:37-42, 1997, pp. 37-42.

Gluodenis, et al., "Minimizing Polyatomic Interferences in ICP/MS", Technology Spotlight, Spectroscopy Showcase, Mar. 1999.

Gut, et al., "Analysis of DNA by 'Charge Tagging' and Matrix—Assisted Laser Desorption/Ionization Mass Spectrometry", Rapid Communications in Mass Spectrometry, 11:43, 1997, p. 43 only.

Harbich, et al., "Deposition of Mass Selected Silver Clusters in Rare Gas Matrices", J. Chem. Phys. 93 (12), Dec. 1990, pp. 8535-8543.

Hausler, "Trace Element Analysis of Organic Solutions Using Inductively Coupled Plasma-Mass Spectrometry", Spectrochimica Acta, 42B (½), 1987, pp. 63-73.

Hunt, Donald, F., et al., "Mixture Analysis by Triple-Quadrupole Mass Spectrometry: Metabolic Profiling of Urinary Carboxylic Acids," Clin. Chem., 1982, vol. 28, No. 12, pp. 2387-2392.

Japanese Decision to Refuse, Japanese Patent Application No. 504259/2004, 2 pages.

Johnston, M., "Energy Filtering in Triple Quadrupole MS/MS," Finnigan MAT, San Jose, California, USA, No. 203, 1984.

King, F.L., et al., "Collision-Induced Dissociation of Polyatomic Ions in Glow Discharge Mass Spectrometry," International Journal of Mass Spectrometry and Ion Processes, 1989, vol. 89, pp. 171-185.

King, F.L., et al., "Study of Molecular Interferences in Glow Discharge Mass Spectrometry," Journal of Analytical Atomic Spectrometry, Sep. 1988, vol. 3, pp. 883-886.

McLafferty, "Tandem Mass Spectrometry," John Wiley & Sons, 1983, pp. 11-50.

Morris, Michael, et al., "Low-Energy Ion/Molecule Products from Collisions with Ammonia," Rapid Communications in Mass Spectrometry, 1993, vol. 7, pp. 1136-1140.

(56) References Cited

OTHER PUBLICATIONS

Nabeshima, T., et al., "Development Of Ion Trap Mass Spectrometer With Plasma Ion Source", 2000 Winter Conference On Plasma Spectrochemistry, Fort Lauderdale, FL (abstract).
Olivares, et al., "On-Line Mass Spectrometric Detection for Capillary Zone Electrophoresis," Anal. Chem., 1987, vol. 59, pp. 1230-1232.
PCT Search Report prepared by the European Patent Office for PCT Application No. PCT/GB03/02041, 4 pages.
Reimann, et al., "Graphite Surface Topography Induced By Ta Cluster Impact And Oxidative Etching", Nuclear Instruments and Methods in Physics Research B 140, 1998, pp. 159-170.
Rowan, "Collisional Removal of Molecular Ions in Inductively Coupled Plasma Mass Spectrometry", M.S. Thesis, Iowa State Univ. 1988.
Schwartz, Jae, C., et al., "Systematic Delineation of Scan Modes in Multidimensional Mass Spectrometry," Anal. Chem. 1990, vol. 62, pp. 1809-1818.
Search Report for British Patent Application No. GB0210930.4, dated Feb. 26, 2003, 2 pages.
Smith, Richard, D., et al., "Capillary Zone Electrophoresis-Mass Spectrometry Using an Electrospray Ionization Interface," Anal. Chem., 1988, vol. 60, pp. 436-441.
Summary of Notice of Grounds for Rejection, Japanese Patent Application No. 504259/2004, 3 pages.
VG Elemental Fisons Instruments, PlasmaQuad System Manual, pp. 2-32 through 2-38, Issue 1, 1993.
VG Elemental, PlasmaQuad System Manual, Version 2b, Jun. 1988, pp. 25-29, 1988.
Zhang, et al., "Development of an Electrostatic Ion Guide in Chemical Ionization," Review of Scientific Instruments, American Institute of Physics, Nov. 1998, vol. 69, No. 11, pp. 4002-4003.
Examination Report dated Apr. 17, 2012 in EP Application No. 10000216,1, 5 pages.
Summons to Attend Oral Proceedings dated Jan. 24, 2013 in EP Application No. 10000216,1, 7 pages.
Search Report Examination Report dated Apr. 28, 2010 in EP Application No. 10000216,1, 12 pages.
Office Action mailed Feb. 14, 2014 in U.S. Appl. No. 14/032,110, 11 pages.
European Search Report mailed Oct. 15, 2014 in EP Patent Application No. 14175305, 7 pages.
Rowan, et al., "Attenuation of Polyatomic Ion Interferences in Inductively Coupled Plasma Mass Spectrometry by Gas-Phase Collisions," *Applied Spectroscopy*, vol. 43, No. 6, 1989, pp. 976-980.
Douglas, et al., "Elemental Analysis with a Microwave-Induced Plasma/Quadrupole Mass Spectrometer System", Analytical Chemistry, vol. 53, No. 1, 37-41, Jan. 1981.
Tanner, et al., "Gas and Ion Dynamics of a Three-Aperature Vacuum Interface for Inductively Coupled Plasma-Mass Spectrometry", Applied Spectroscopy, vol. 48, No. 11, 1373-1378, 1994.

* cited by examiner

MEANS FOR REMOVING UNWANTED IONS FROM AN ION TRANSPORT SYSTEM AND MASS SPECTROMETER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

The present invention relates to inductively coupled plasma mass spectrometry (ICPMS). However, the concepts can be applied to any type of mass spectrometer which generates unwanted artefact ions as well as ions of analytical significance, such artefact ions having properties that allow them to be selectively removed from the ion beam by causing them to interact with a reagent gas whilst the ions of analytical significance are substantially retained in the beam.

BACKGROUND OF THE INVENTION

The general principles of ICPMS are well known. It is a method of elemental analysis providing information about the elemental composition of a sample, with little or no information about its molecular structure. Typically, the sample is a liquid, which is nebulised and then passed through an electrically-maintained plasma, in which the temperature is high enough to cause atomization and ionisation of the sample. Typically temperatures greater than 5000K are used. The ions produced are introduced, via one or more stages of pressure reduction, into a mass analyser. The mass analyser is most commonly a quadrupole, although magnetic sector analysers are also used and, more recently, time-of-flight devices.

A problem common to all of these, although most troublesome in low-resolution devices such as quadrupoles, is the presence in the mass spectrum of unwanted artefact ions that impair the detection of some elements. The identity and proportion of artefact ions depends upon the chemical composition of both the plasma support gas and that of the original sample. There are many such artefact ions. Typical are argon-containing molecular ions that are encountered in argon-based ICPMS, which is the most widespread technique. Argon oxide $ArO^+$ and argon dimer ($Ar_2^+$) are prominent, and interfere with the detection of iron ($^{56}Fe$) and selenium ($^{80}Se$) respectively. An example of a troublesome atomic ion is $Ar^+$, which interferes with the detection of $^{40}Ca$.

A collision cell may be used to remove unwanted artefact ions from an elemental mass spectrum. The use of a collision cell is described in EP 6 813 228 A1, WO 97/25737 and U.S. Pat. No. 5,049,739.

A collision cell is a substantially gas-tight enclosure through which ions are transmitted. It is positioned between the ion source and the main spectrometer. A target gas is admitted into the collision cell, with the objective of promoting collisions between ions and the neutral gas molecules or atoms. The collision cell may be a passive cell, as disclosed in U.S. Pat. No. 5,049,739, or the ions may be confined in the cell by means of ion optics, for example a multipole which is driven with a combination of alternating and direct voltages, as in EP 0 813 228. By this means the collision cell can be configured so as to transmit ions with minimal losses, even when the cell is operated at a pressure that is high enough to guarantee many collisions between the ions and the gas molecules.

By careful control of the conditions in the collision cell, if is possible to transmit the wanted ions efficiently. This is possible because in general the wanted ions, those that form part of the mass spectrum to be analyzed, are monatomic and carry a single positive charge, that is, they have "lost" an electron. If such an ion collides with a neutral gas atom or molecule, the ion will retain its positive charge unless the first ionisation potential of the gas is low enough for an electron to transfer to the ion and neutralise it. Consequently, gases with high ionisation potentials are ideal target gases.

Conversely, it is possible to remove unwanted artefact ions whilst continuing to transmit the wanted ions efficiently. For example the artefact ions may be molecular ions such as $ArO^+$ or $Ar_2^+$ which are much less stable than the atomic ions. In a collision with a nuetral gas atom or molecule, a molecular ion may dissociate, forming a new ion of lower mass and one or more neutral fragments. In addition, the collision cross section for collisions involving a molecular ion tends to be greater than for an atomic ion. This was demonstrated by Douglas (Canadian Journal Spectroscopy, 1989 vol 34(2) pp 36-49). Another possibility is to utilise reactive collisions. Eiden et al. (Journal of Analytical Atomic Spectrometry vol 11 pp 317-322 (1996)) used hydrogen to eliminate many molecular ions and also $Ar^+$, whilst analyte ions remain largely unaffected.

However, when the collision cell is operated at a pressure that is sufficiently high to promote removal of the artefact ions that originate in the plasma, other artefact ions may form. The chemical nature of these ions is not always known with certainty, but, for example, hydrocarbons that are present in the residual gas composition may be ionised by charge exchange. Various species of metal oxide and/or hydroxide ions such as $LaO^+$ and $LaOH^+$ have been observed, apparently formed in ion-molecule reactions in the cell. Water adduct ions such as $LaO.H_2O^+$ have also been observed. The artefact ions that are removed in the collision cell can also be generated there, for example by reactions such as:

$$O^+ + Ar \Rightarrow ArO^+$$

so that the extent to which such ions are removed from the beam will depend on the equilibrium of two or more reaction pathways.

Even when no collision gas is being admitted to the cell, the local pressure in the cell can be quite high, due to the gas load from the plasma itself. The gas load from the plasma is composed primarily of the plasma support gas. and so is generally neutral argon. The gas load from the plasma consists of a directed flow, which is carried with the ion beam, and a general back pressure in the evacuated chamber through which the ion beam passes. The gas load from the plasma will also contain other species, typically hydrogen and oxygen of the sample is dissolved in water, and probably organics, for example from rotary pump oil from the expansion chamber, which is the coarse vacuum stage commonly employed in ICPMS as the first stage of pressure reduction.

The present inventors have used a calculation similar to that described by Douglas and French (1988) to estimate the gas load on a collision cell in a typical prior art mass spectrometer. This calculation suggests that the local partial pressure in the cell due to the gas load from the plasma can be 0.001 mbar or even greater, especially if the collision cell is close to the ion source. Using a capillary connected to a capacitance manometer to measure the stagnation pressure in the sampled beam, the present inventors have found that with the probe on axis and 42 mm from the skimmer, a stagnation pressure of 0.2 mbar was measured, reducing to 0.002 mbar at a distance of 82 mm from the skimmer.

If the collision cell contains a significant partial pressure of argon, this will upset the operation of the instrument in two ways. Firstly, the ion beam will be attenuated by collisions between the ions in the beam and argon neutrals. Secondly, the presence of a large concentration of argon neutrals will favour the production of argon-containing molecular ions in reaction with ions in the beam. Similar considerations apply to other contaminants, in particular the organics, which have the potential to generate a rich spectrum of mass peaks.

It is an objective of this invention to provide a means whereby the formation, or re-formation, of unwanted artefact ions in a collision cell or other ion transport system may be minimised.

DISCLOSURE OF THE INVENTION

According to the present invention, a mass spectrometer comprises:

means for generating ions from a sample introduced into a plasma;

a sampling aperture tor transmitting some of the ions into an evacuated expansion chamber along a first axis to form an ion beam;

a second aperture for transmitting some of the ion beam into a first evacuated chamber maintained at high vacuum;

a first ion optical device located in the first evacuated chamber for containing the ion beam;

a third aperture for transmitting the ion beam into a second evacuated chamber maintained at a lower pressure than the first evacuated chamber;

a collision cell having an entrance aperture and an exit aperture and pressurized with a target gas, the collision cell being disposed in the second evacuated chamber;

a second ion optical device located in the collision cell for containing the ion beam;

a fourth aperture for transmitting the ion beam into a third evacuated chamber containing mass-to-charge ratio analysing means disposed along a second axis for mass analysing the ion beam to produce a mass spectrum of the ion beam wherein the third evacuated chamber is maintained at lower pressure than the second evacuated chamber.

Preferably, the first evacuated chamber is maintained at a pressure of approximately $10^{-2}$ to $10^{-4}$ mbar, more preferably approximately $1\text{-}2\times10^{-3}$ mbar.

The provision of the first evacuated chamber at high vacuum between the expansion chamber and the second chamber containing the collision cell reduces the gas load on the collision cell, by minimising the residual pressure within the collision cell that is attributable to the gas load from the plasma source, and ensuring that the neutral gas composition within the collision cell is essentially that of the collision gas itself. The background gas load is reduced because the vacuum pump maintaining the first evacuated chamber at high vacuum removes the general background gas load, preventing it from entering the second chamber and the collision cell. The directed flow is reduced because the neutral gas flow is not confined by the first ion optical device and therefore diverges from the ion beam in the first evacuated chamber and therefore the directed flow of neutral gas entering the second evacuated chamber is considerably reduced. The ion optical device located in the first evacuated chamber enables sufficient transmission of ions through the first evacuated chamber.

The directed flow of neutrals entering the collision cell is further reduced by the provision of a gap between the third aperture and the entrance of the collision cell. The directed flow diverges from the ion beam as it passes through the third aperture and is skimmed off by the edges of the entrance aperture to the collision cell. Preferably this gap is at least 2 cm.

Preferably, the distance between the ion source and the collision cell is at least 90 mm. This is sufficient distance to allow the directed flow to diverge from the ion beam and thereby to reduce the gas load on the collision cell to a level that ensures that the neutral gas composition within the collision cell is essentially that of the collision gas alone. Given a particular gas load from the plasma, the pressure developed in the collision cell due to that gas load depends essentially upon simple geometric factors. Assuming a free jet expansion and ignoring shockwave effects, the gas load that enters the cell is proportional to the solid angle subtended at the ion source by the entrance aperture to the collision cell. The pressure developed in the collision cell is proportional to the gas load that enters the cell. The pressure is inversely proportional to the gas conductance out of the cell to regions that operate at a lower pressure; that is, to the total area of any apertures that communicate from the interior of the cell to any such region. The area of these apertures is constrained by practical considerations in that one must ensure that when the cell is pressurised (typically in the range 0.001 mbar to 0.1 mbar) with collision gas, the region outside the collision cell is maintained at an acceptably low pressure. By way of example, if the vacuum chamber containing the collision cell is pumped by means of a high vacuum pump of capacity 250 liters/second, the cell is to operate at a pressure of 0.02 mbar, a pressure of $10^{-4}$ mbar outside the collision cell is required, then the maximum acceptable conductance out of the collision cell is $250\times(1\times10^{-4})/0.02$ or 1.25 liters/second. This might correspond to an entrance aperture and an exit aperture both of diameter 2.3 mm if the collision gas is air.

It is desirable to minimise the local partial pressure within the collision cell due to the gas load from the plasma, or at least to ensure that the said pressure is acceptably low. Since the size of the cell apertures is essentially predetermined, the gas load from the plasma must be reduced by increasing the distance $D_{cell}$ from the ion source to the entrance aperture of the collision cell. The value deemed acceptable for the local pressure will depend on the length of the collision cell, but for a cell of length 130 mm a local partial pressure of less than 0.001 mbar is desirable. A calculation based on gas dynamics and largely following the treatment of Douglas and French (1988) suggests that $D_{cell}$ should be at least 200 mm for the partial pressure in the cell due to the gas load from the plasma to be less than 0.001 mbar. The present inventors have made measurements with a capacitance manometer which indicate that a smaller distance, about 90 mm, is adequate. If $D_{cell}$ is increased, the effect is to reduce the local pressure in the cell still further. However, this also has the effect of reducing the transmission efficiency of the ion optics and generally makes the design of the instrument more difficult. The present inventors have found that it is advantageous that $D_{cell}$ be less than 200 mm.

Preferably, the mass-to-charge ratio analysing means includes a main mass filter which preferably is an RF quadrupole, although a magnetic sector or a time-of-flight analyser may alternatively be employed.

The first ion optical device may be a static lens stack, an electrostatic ion guide, or an electrodynamic ion guide such as an RF multipole. Preferably, the ion optical device is a mass selective device. It is advantageous to employ a quadrupole, since this can be driven so as to transmit only ions of a specific mass to charge ratio (m/e) or a range of m/e. It thus functions as a auxiliary mass filter. A magnetic sector could be employed in a similar fashion. The auxiliary mass filter can be advantageously employed to first reduce the contribution of artefact ions to the mass spectrum, since it is set to transmit only ions from the same m/e as the main mass filter. Any artefact ion that is formed in the collision cell must therefore be a reaction product from an ion of the m/e that is selected in both the auxiliary mass filter and main mass filter. The artefact ion must have a different m/e from that selected, and so will not be transmitted by the main mass filter. Hence the mass spectrum is essentially free from artefact ions. For example, if the auxiliary mass filter is tuned so as to transmit essentially the ions of m/e 56, then the ions that enter the collision cell will be $^{56}Fe^+$ and $^{40}Ar^{16}O^+$ (an unwanted molecular ion that is formed in the plasma source). In the collision cell, $^{40}Ar^{16}O^+$ will be lost, while $^{56}Fe^+$ is transmitted efficiently. Although molecular or adduct ions may be formed, such as $^{56}Fe^{16}O^+$ at m/e 72 or $^{56}Fe.H_2O^+$ at m/e 74, these cannot cause mass spectral interference as the main mass filter is set instantaneously to pass only ions of m/e 56. The auxiliary mass filter and the main mass filter scan synchronously, so if the main mass filter is set to transmit m/e 72, no $^{56}Fe^{16}O^+$ can form in the collision cell because the auxiliary mass filter will have removed $^{56}Fe^+$ from the beam before it can enter the collision cell. Similar arguments apply to artefact ions formed by the fragmentation of molecular ions.

A further advantage of making the ion optical device a mass selective device, such as a quadrupole, is that the most abundant ions in the plasma beam are rejected by the mass selective device. The ion beam that leaves the device is much less intense, and exhibits little or no tendency to diverge under the influence of space-charge. It is therefore much easier to design the subsequent stages of ion optics to transport the beam efficiently.

The second ion optical device may be a static lens stack, an electrostatic ion guide, or a magnetic sector, but preferably it is an RF multipole. The second ion optical device may also be mass selective instead of, or as well as, the first ion optical device.

Preferably the second axis of the mass to charge ratio analysing means is offset faun the first axis. This is effective in reducing the unresolved baseline noise signal that is generally present in ICPMS instruments.

Preferably, the first evacuated chamber is divided into a first region adjacent to the expansion chamber, and a second region adjacent to the collision cell, by a large diameter aperture. The ion optical device is located in the second region, and the first region may contain an extractor lens driven at a negative potential. Preferably the diameter of the aperture is approximately 20 mm, and it is preferably sealable. This may be achieved by means of a flat plate on an O-ring seal. This enables the second region to be isolated and maintained at a high pressure while the expansion chamber and the first region are vented to atmospheric pressure. This facilitates access to the components most prone to contamination, so that they can be readily replaced or refurbished.

BRIEF DESCRIPTION OF THE DRAWINGS

The invention is described with reference to the accompanying drawings in which.

DETAILED DESCRIPTION OF A PREFERRED EMBODIMENT

Figure 1:
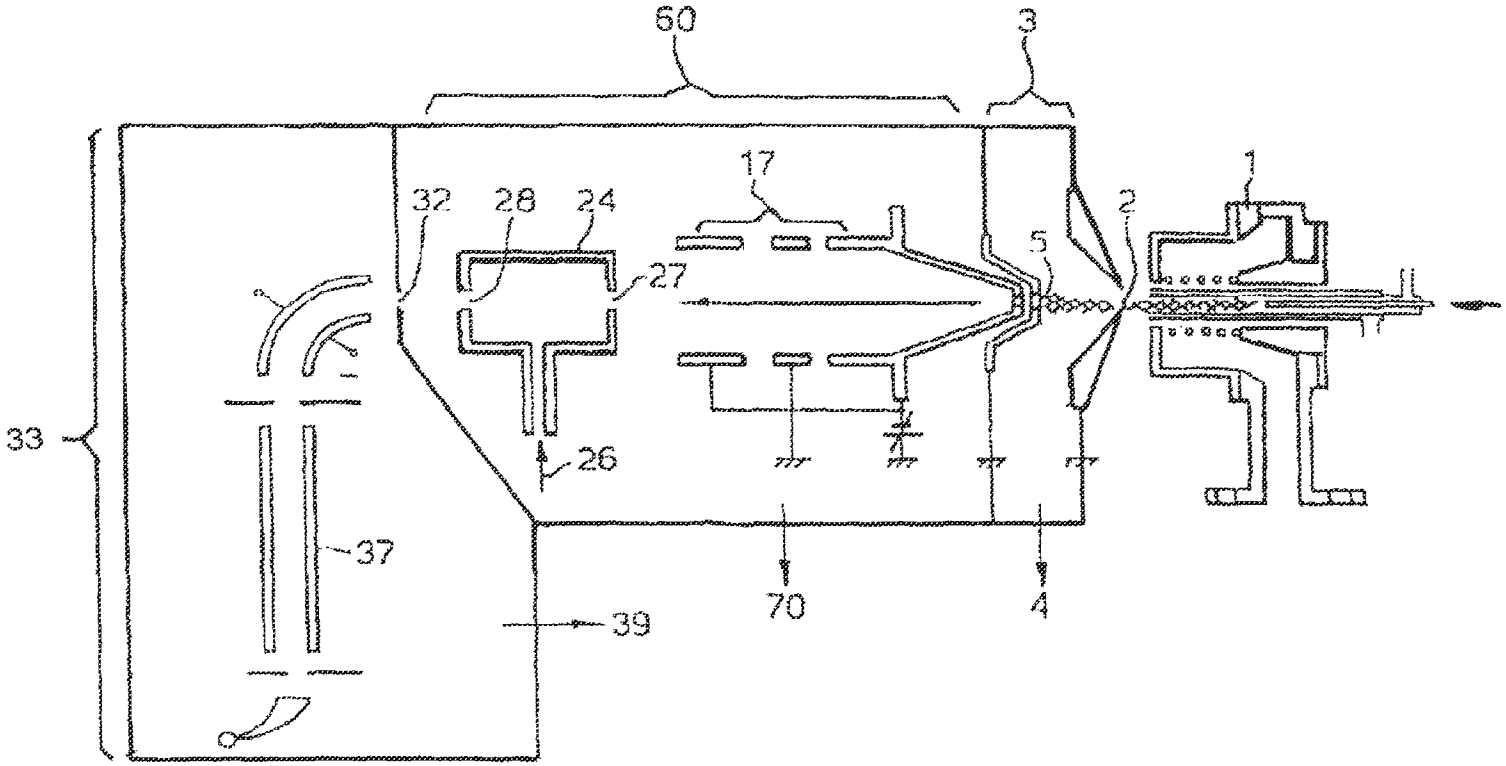
PRIOR ART Fig. 1.
FIG. 1 shows a prior art mass spectrometer.

In the prior art mass spectrometer of FIG. 1, the inductively-coupled plasma (ICP) ion source 1 is of conventional design, operating at atmospheric pressure. Ions are generated in the plasma and entrained in the general gas flow, part of which passes through a sampling aperture 2. The expansion chamber 3, is located behind the sampling aperture 2 and is evacuated by means of a rotary-vane vacuum pump at 4. The gas flow that passes through the first aperture 2 expands as a super-sonic free jet, the central portion of which passes through the second aperture 5 into an evacuated chamber 60. Aperture 5 is in the form of a skimmer, for example such as described in U.S. Pat. No. 5,051,584. Located in the evacuated chamber 60 is an ion optical device 17, in this case a lens stack, and a collision cell 24 having an entrance aperture 27 and an exit aperture 28. The collision cell 24 is a simple passive collision cell ie a chamber pressurised with target gas 26. On exiting the collision cell 24, the ion beam passes through aperture 32 into evacuated chamber 33 which contains a mass analyser 37.

Figure 2:
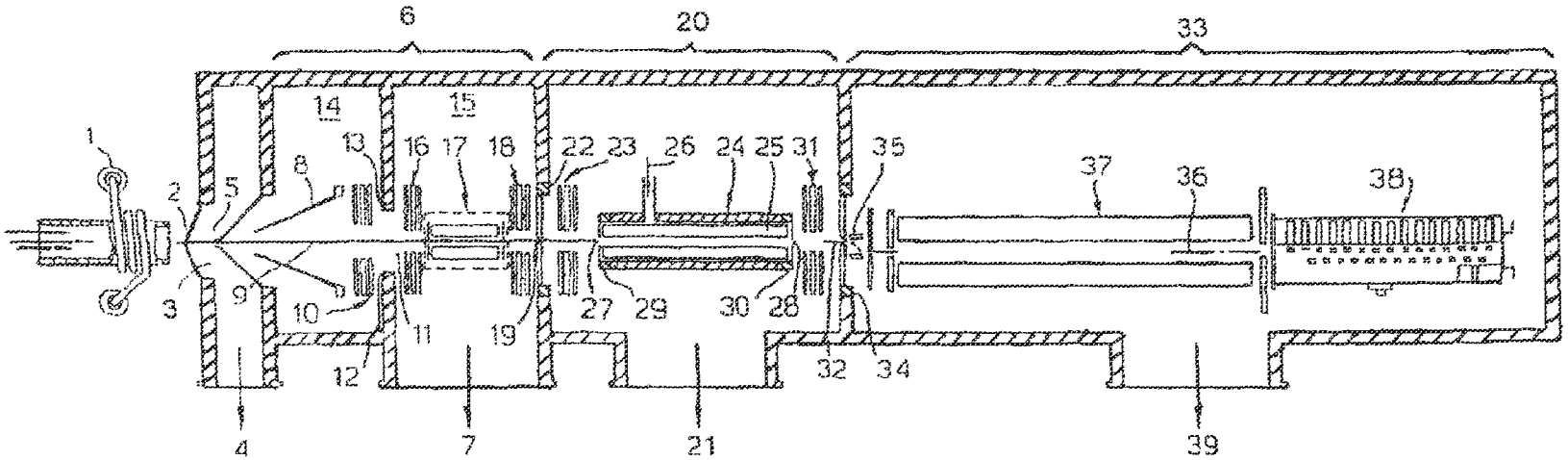
FIG. 2 shows a preferred embodiment of the present invention.

FIG. 2 shows an embodiment of the present invention in which parts corresponding to those shown in FIG. 1 are numbered accordingly. As in the prior art, the ICP ion source 1 generates ions which pass through a sampling aperture 2 into the expansion chamber 3 which is evacuated by means of a rotary-vane vacuum pump at 4. The gas flow that passes through the first aperture 2 expands as a super-sonic free jet, the central portion of which passes through the second aperture 5.

In the present invention the evacuated chamber 60 of the prior art is divided into two chambers, a first evacuated chamber 6 and a second evacuated chamber 20. The first evacuated chamber 6 is maintained at high vacuum by a high-vacuum pump, preferably a turbo-molecular pump, located at 7. The pressure in the first evacuated chamber may be of the order of $10^{-2}$ to $10^{-4}$ mbar, depending on the size of pump used, but is typically $1\text{-}2\times10^{-3}$ mbar.

The sample beam is believed to pass through the aperture 2 in a substantially neutral state. Under the influence of the extractor lens 8, which is driven at a negative potential, typically −200 to −1000 volts, electrons are diverted rapidly from the beam, and positive ions are accelerated away from the aperture 5 along the axis of the instrument. They are focussed by an ion lens 10 through an aperture 11, of relatively large diameter, typically about 20 mm. A flat plate 12 slides on an O-ring seal 13 and can be moved so as to completely obscure and seal the aperture 11. The aperture 11 divides the first evacuated chamber 6 into a first region 14 and a second region 15. Chamber 6 must be pumped efficiently, and so region 15 must offer a relatively unrestricted conductive. Preferably it will be at least as wide as the diameter of the high-vacuum pump 7.

When the plate 12 is retracted, aperture 11 provides a large pumping conductance, so that regions 14 and 15 are at essentially similar pressures, although the pressure in the region 14 closer to the skimmer may be marginally higher. The whole of the first evacuated chamber 6 is maintained at high vacuum by means of the high-vacuum pump at 7.

When the plate 12 is positioned so as to block the aperture 11, the region 15 is still maintained at high vacuum. However, region 14 is then pumped only via aperture 5, and so the pressure in region 15 becomes essentially that of the expansion chamber 3 between apertures 2 and 5, It is then possible to vent the expansion chamber 3 and region 14 to atmospheric pressure whilst maintaining high vacuum in region 15. This facilitates access to the components most prone to contamination, so that they can be readily replaced or refurbished.

The ions that have passed through aperture 11 are directed by an ion lens 16 into an ion optical device 17. Device 17 assists in containing the ion beam, which otherwise would tend to diverge rapidly under the influence of positive ion space-charge, and cause severe loss of sensitivity. The directed flow of neutral gas from the plasma, however, is not confined by the ion optical device 17 and diverges from the ion beam to be removed, along with the general back pressure of gas in the chamber 6, by the vacuum pump 7. Device 17 may be a quadrupole, a higher order multipole, an ion guide or an ion lens. As mentioned above, it is advantageous if the transmission-enhancing device can be made to the mass-selective. Preferably it will be a quadrupole, although in principle another mass selective device, such as a magnetic sector, could also be employed.

Ions transmitted by device 17 are focussed by the ion lens 18, and pass through an aperture 19 into the second evacuated chamber 20, maintained at a pressure lower than that of the first evacuated chamber 6 by a high-vacuum pump, preferably a turbo-molecular pump, located at 21. The pressure of this chamber is of the order $10^{-3}$ to $10^{-5}$ mbar, typically $1\text{-}2\times10^{-4}$ mbar. Aperture 19 has a relatively small diameter, typically 2-3 mm, thus establishing a pressure differential between the first evacuated chamber 6 and the second evacuated chamber 20. This prevents the background gas from chamber 6 from entering chamber 20, reducing the gas load on chamber 20, and so minimises any residual pressure in the chamber 20 due to the nuetral gas load from the plasma. It is advantageous if aperture 19 is mounted on an insulator 22, so that it can be biased negative, causing ions to pass through it with relatively high translational energy. This helps to ensure efficient transport of the ions through the apertures 19 both by lowering the charge density within the beam and by minimising the beam divergence.

The ions are focussed by ion lens 23 into a collision cell 24, which is located in the second evacuated chamber 20. The collision cell 24 has an entrance aperture 27 and an exit aperture 28. As the ion beam emerges from the aperture 19, the neutral gas flow diverges and is skimmed off by the entrance aperture 27 of the collision cell 24, thus further reducing the gas load on the collision cell 24. Located in collision cell 24 is a multipole ion optical assembly 25. This may be a quadrupole, hexapole or octapole. The collision cell 25 is pressurised with a target gas 26, chosen for its capacity to remove, via a mechanism such as attachment or fragmentation, unwanted molecular ions from the ion beam whilst influencing other ions minimally. Typically the target gas may be helium or hydrogen, although many other gases may prove beneficial for specific analytical requirements.

Apertures 27 and 28 limit the gas conductance out of the collision cell, thus allowing it to operate at a relatively high pressure, typically in the range 0.001 mbar to 0.1 mbar, whilst minimising the gas load on chamber 20 and its associated high vacuum pump 21. The transport efficiency of ions through apertures 27 and 28 is improved by biassing the apertures negative. They are mounted on the collision cell by means of insulating gas-tight supports 29 and 30.

Ions that leave the collision cell 24 are accelerated and focussed by ion lens 31 through an aperture 32. This aperture establishes a pressure differential between chamber 20 and the third evacuated chamber 33 thus reducing the gas load on chamber 33, and further minimising any residual pressure therein due to the neutral gas load from the plasma. It is advantageous to mount aperture 32 on an insulating support 34. The aperture 32 can be then biassed negative with respect to ground, typically to −100 volts, so that ions pass through it with relatively high translational energy. This helps to ensure efficient transport of the ions through aperture 32 both by lowering the charge density within the beam and by minimising the beam divergence.

The ions pass through aperture 32 at relatively high translational energy, and pass through a double deflector 35 preferably at the same or highly energy. This deflects the ion beam away from the original instrument axis 9 and along the axis 36 of the quadrupole mass filter 37, which is used to mass analyse the ion beam. The double deflector 35 is advantageously in the form of two small cylindrical electrostatic sectors, cross-coupled and in series. We have found this configuration to be especially effective in reducing to below 1 CPS the unresolved baseline noise signal that is generally present in ICPMS instruments.

Ions of the selected m/e or range m/e are transmitted to a detector, which is typically an electron multiplier 38. The first dynode of the electron multiplier 38 is offset from axis 36 of the quadrupole mass filter, which further helps to minimise the unresolved baseline noise signal. Both the mass filter 37 and the detector 38 are housed in the third evacuated chamber 33, which is maintained at a pressure lower than that of the second evacuated chamber 20 by a high-vacuum pump 39. The pressure of this chamber is less than $10^{-4}$ mbar, typically about $10^{-6}$ mbar, although certain types of ion detectors can operate at pressures as high as $2\text{-}5\times10^{-5}$ mbar.

What is claimed is:

1. A mass spectrometer comprising:

means (1) for generating ions from a sample introduced into a plasma;

a sampling aperture (2) for transmitting some of the ions into an evacuated expansion chamber (3) along a first axis (9) to form an ion beam;

a second aperture (5) for transmitting some of the ion beam into a first evacuated chamber (6);

a first pump (7) for maintaining the first evacuated chamber (6) at high vacuum;

a first ion optical device (17) located in the first evacuated chamber (6) for containing the ion beam wherein the first ion optical device (17) is a mass selective device;

a third aperture (19) for transmitting the ion beam into a second evacuated chamber (20);

a second pump (21) for maintaining the second evacuated chamber (20) at a lower pressure than the first evacuated chamber (6);

a collision cell (24) having an entrance aperture (27) and an exit aperture (28) and pressurized with a target gas (26), the collision cell (24) being disposed in the second evacuated chamber (20);

a second ion optical device (25) located in the collision cell (24) for containing the ion beam;

a fourth aperture (32) for transmitting the ion beam into a third evacuated chamber (33) containing mass-to-charge ratio analyzing means (37) disposed along a second axis (36), wherein the mass-to-charge analyzing means is configured to mass analyze the ion beam to produce a mass spectrum of the ion beam such that both the first ion optical device (17) and the mass-to-charge ratio analyzing means (37) operate at the same mass to charge ratio, so as substantially to minimize the formation in the collision cell of interfering ions having the said mass to charge ratio; *and* a third pump (39) for maintaining the third evacuated chamber (33) at lower pressure than the second evacuated chamber (20).

2. A mass spectrometer according to claim 1, wherein the first evacuated chamber (6) is maintained at a pressure of approximately $10^{-2}$ to $10^{-4}$ mbar.

3. A mass spectrometer according to claim 1, wherein the first evacuated chamber (6) is maintained at a pressure of approximately $1\text{-}2\times10^{-3}$ mbar.

4. A mass spectrometer according to claim 1, including a gap of at least 2 cm between the third aperture (19) and the entrance aperture (27) of the collision cell (24).

5. A mass spectrometer according to claim 1, wherein the distance between the ion source (1) and the entrance aperture (27) of the collision cell (24) is 90 to 200 mm.

6. A mass spectrometer according to claim 1, wherein the mass-to-charge ratio analyzing means (37) includes a main mass filter which preferably is an RF quadrupole.

7. A mass spectrometer according to claim 1, wherein the first ion optical device (17) is an RF quadrupole.

8. A mass spectrometer according to claim 1, wherein the second ion optical device (25) is an RF quadrupole.

9. A mass spectrometer according to claim 1, wherein the second ion optical device (25) is mass selective.

10. A mass spectrometer according to claim 1, wherein the second axis (36) of the mass to charge ratio analyzing means (37) is offset from the first axis (9).

11. A mass spectrometer according to claim 1, wherein the first evacuated chamber (6) is divided into a first region (14) adjacent to the expansion chamber containing an extractor lens (8) driven at a negative potential, and a second region (15) adjacent to the collision cell (24) in which the ion optical device (17) is located, by a large diameter aperture (11) and the aperture is sealable by means of a flat plate (12) on an O-ring seal (13).

12. A mass spectrometer according to claim 1, wherein the first ion optical device and the mass-to-charge analyzing means are configured to scan synchronously.

13. A method of operating a mass spectrometer that incorporates a collision cell pressurized with a target gas, the method comprising:

generating an ion beam by introducing a sample into a plasma, the [ione] *ion* beam including analyte ions having an analyte mass to charge ratio and unwanted ions;

mass selecting at least a portion of the ion beam at the analyte mass to charge ratio;

transmitting at least a portion of the mass selected ion beam into the collision cell, the mass selecting step being effective substantially to minimize the formation in the collision cell of interfering ions having the analyte mass to charge ratio;

receiving at least a portion of the ion beam from the collision cell at a mass analyzer; and mass analyzing the received ion beam at the same analyte mass to charge ratio as in the mass selecting step.

14. A method according to claim 13, wherein a distance of 90 to 200 mm is maintained between the ion source and an entrance aperture of the collision cell.

15. A method according to claim 13, wherein mass selecting and mass analyzing comprise scanning synchronously.

16. A method according to claim 13, wherein the mass selecting is achieved by passing the ion beam through a first mass selective ion optical device.

17. A method according to claim 16, wherein the first mass selective ion optical device is an RF quadrupole.

18. A method according to claim 16, wherein the first mass selective ion optical device is located in a first evacuated chamber maintained at high vacuum.

19. A method according to claim 18, wherein the first evacuated chamber is maintained at a pressure of approximately $10^{-2}$ to $10^{-4}$ mbar.

20. A method according to claim 18, wherein the first evacuated chamber is maintained at a pressure of approximately $1\text{-}2\times10^{-3}$ mbar.

21. A method according to claim 18, wherein the first evacuated chamber is divided into a first region adjacent to the expansion chamber containing an extractor lens driven at a negative potential, and a second region adjacent to the collision cell, by a large diameter aperture and the aperture is sealable by means of a fiat plate on an O-ring seal.

22. A method according to claim 18, wherein the collision cell is located in a second evacuated chamber operated at lower pressure than the first evacuated chamber, the ion beam being contained in the second evacuated chamber by a second ion optical device.

23. A method according to claim 22, wherein the second ion optical device is an RF quadrupole.

24. A method according to claim 22, wherein the second ion optical device is mass selective.

25. A method according to claim 22, further comprising transmitting at least a portion of the ion beam from the ion source through a sampling aperture into an evacuated expansion chamber along a first axis, into the first evacuated chamber through a second aperture;

wherein transmitting at least a portion of the mass selected ion beam into the collision cell includes transmitting at least a portion of the ion beam into the second evacuated chamber through a third aperture, wherein a gap of at least 2 cm is maintained between the third aperture and an entrance aperture of the collision cell.

26. A method according to claim 25, wherein the mass analyzer is located in a third evacuated chamber operated at lower pressure than the second evacuated chamber, the mass analyzer being disposed along a second axis.

27. A method according to claim 26, wherein the second axis is offset from the first axis.

28. A mass spectrometer comprising:

*an inductively coupled* plasma ion source for generating ions from a sample*, the generated ions including first atomic ions having a first mass-to-charge ratio and artefact ions having a mass-to-charge ratio that interferes with the first mass-to-charge ratio*;

an ion optical device disposed to receive at least a portion of an ion beam generated by the ion source, the ion optical device being configured to mass select at least a portion of the ion beam generated by the ion source at [a] *the first* mass-to-charge ratio*, thereby removing, from the ion beam, ions not having the first mass-to-charge ratio*;

a collision cell disposed to receive at least a portion of a mass selected ion beam from the ion optical device *and configured to remove, from the mass selected ion beam, artefact ions having a mass-to-charge ratio that interferes with the first mass-to-charge ratio*, the ion optical device being configured substantially to minimize the formation in the collision cell of interfering *artefact* ions having the [said] *first* mass-to-charge ratio; and a mass analyzer disposed to receive at least a portion of the mass selected ion beam from the collision cell, the mass analyzer being configured to mass analyze the received ion beam at the same mass-to-charge ratio as the ion optical device*, wherein the mass analyzer is configured*

*to detect the first atomic ions when the same mass-to-charge ratio is the first mass-to-charge ratio.*

29. A mass spectrometer according to claim 28, wherein the ion optical device and the mass analyzer are configured to scan synchronously.

30. A mass spectrometer according to claim 28, wherein the mass analyzer is configured to mass select the ion beam received from the collision cell at the mass-to-charge ratio.

31. A mass spectrometer according to claim 28, wherein the ion optical device comprises a first RF quadrupole.

32. A mass spectrometer according to claim 31, wherein the mass analyzer comprises a second RF quadrupole.

33. A mass spectrometer according to claim 28, wherein the ion optical device is disposed in a first evacuated chamber, the collision cell is disposed in a second evacuated chamber, and the mass analyzer is disposed in a third evacuated chamber.

34. A mass spectrometer according to claim 28, further comprising a second ion optical device located in the collision cell for containing the ion beam.

*35. A mass spectrometer according to claim 1, wherein the means (1) for generating ions from a sample introduced into a plasma uses argon, and wherein the collision cell does not contain a significant partial pressure of argon.*

*36. A mass spectrometer according to claim 1, wherein the operation of the first ion optical device (17) and the mass-to-charge ratio analyzing means (37) at the same mass to charge ratio to produce the mass spectrum of mass-to-charge ratios includes synchronously scanning the first ion optical device (17) and the mass-to-charge ratio analyzing means (37) over a spectrum of mass-to-charge ratios.*

*37. The method according to claim 13, wherein mass analyzing the received ion beam at the same analyte mass to charge ratio as in the mass selecting step is performed at a plurality of analyte mass to charge ratios.*

*38. The method according to claim 37, further comprising:*

*obtaining a mass spectrum of the ion beam by a synchronous scan that mass analyzes the received ion beam at the same analyte mass to charge ratio as in the mass selecting step at the plurality of analyte mass to charge ratios.*

*39. The method according to claim 13, wherein the collision cell does not contain a significant partial pressure of argon.*

*40. The method according to claim 13, wherein the collision cell is pressurized with a target gas that is not argon.*

*41. The method according to claim 13, wherein the plasma is an inductively coupled plasma.*

*42. The method according to claim 41, wherein the inductively coupled plasma includes argon, and wherein the collision cell does not contain a significant partial pressure of argon.*

*43. The method according to claim 42, wherein the collision cell is pressurized with helium or hydrogen.*

*44. A mass spectrometer according to claim 28, wherein the generated ions further include second atomic ions having a second mass-to-charge ratio and artefact ions having a mass-to-charge ratio that interferes with the second mass-to-charge ratio,*

*wherein the ion optical device is further configured to mass select at least a portion of the ion beam generated by the ion source at the second mass-to-charge ratio, and*

*wherein the mass analyzer is configured to detect the second atomic ions when the same mass-to-charge ratio is the second mass-to-charge ratio.*

*45. A mass spectrometer according to claim 28, wherein the inductively coupled plasma includes argon, and wherein the collision cell does not contain a significant partial pressure of argon.*

*46. A mass spectrometer according to claim 45, wherein the collision cell is pressurized with helium or hydrogen.*

*47. A mass spectrometer according to claim 28, wherein the artefact ion include molecular ions.*

*48. A mass spectrometer according to claim 28, wherein the artefact ions are reacted or collided with a collision gas in the collision cell to form ions having mass-to-charge ratios that do not interfere with the first mass-to-charge ratio, thereby removing artefact ions.*

*49. A mass spectrometer according to claim 48, wherein at least some of the artefact ions are collided with the collision gas to form ions that have lower mass-to-charge ratios than the first mass-to-charge ratio.*

*50. A mass spectrometer according to claim 48, wherein at least some of the artefact ions are reacted with the collision gas to form ions that have higher mass-to-charge ratios than the first mass-to-charge ratio.*

* * * * *